United States Patent

[11] 3,550,735

| [72] | Inventor | Lawrence O. Olsen<br>Portland, Oreg. |
|---|---|---|
| [21] | Appl. No. | 761,422 |
| [22] | Filed | Sept. 23, 1968 |
| [45] | Patented | Dec. 29, 1970 |
| [73] | Assignee | Hyster Company<br>Portland, Oreg.<br>a corporation of Nevada |

[54] FLUID PRESSURE REVERSING CLUTCHES AND BRAKE FOR WINCH
15 Claims, 6 Drawing Figs.

[52] U.S. Cl............................................. 192/17,
192/4, 192/51, 192/87.19; 254/187, 137/625.25
[51] Int. Cl.......................................................... F16d 67/00
[50] Field of Search............................................ 192/4, 4R,
12.1, 17.1, 18.1

[56] References Cited
UNITED STATES PATENTS

| 2,279,597 | 4/1942 | Selmer .......................... | 192/12.1 |
| 2,372,311 | 3/1945 | Brown........................... | 192/12.1X |
| 2,513,812 | 7/1950 | McClay.......................... | 192/17.1X |
| 2,590,172 | 3/1952 | Guier et al. .................... | 192/12.1X |
| 2,703,162 | 3/1955 | Kiem et al...................... | 192/17.1X |
| 3,128,861 | 4/1964 | Trondsen ....................... | 192/17.1 |

*Primary Examiner*— Benjamin W. Wyche III
*Attorney*—Buckhorn, Blore, Klarquist and Sparkman ABSTRACT: A power-controlled winch having a drum, a fluid-actuated forward and reverse friction clutch, and a fluid-actuated brake for the drum biased to an engaged position but releasable under an operating pressure is controlled by a five-position spool valve and a three-position spool valve. The five-position valve controls the flow of fluid under operating pressure to the clutches and to the brake to provide for spooling in or spooling out of the winch under power, free spooling or inching with the clutches disengaged. The overriding three-position valve controls operating pressure at the brake independently of the position of the five-position spool valve to provide fine inching control with one or the other clutch engaged, thereby enabling inching while spooling in or spooling out under power.

PATENTED DEC 29 1970
3,550,735
SHEET 1 OF 3
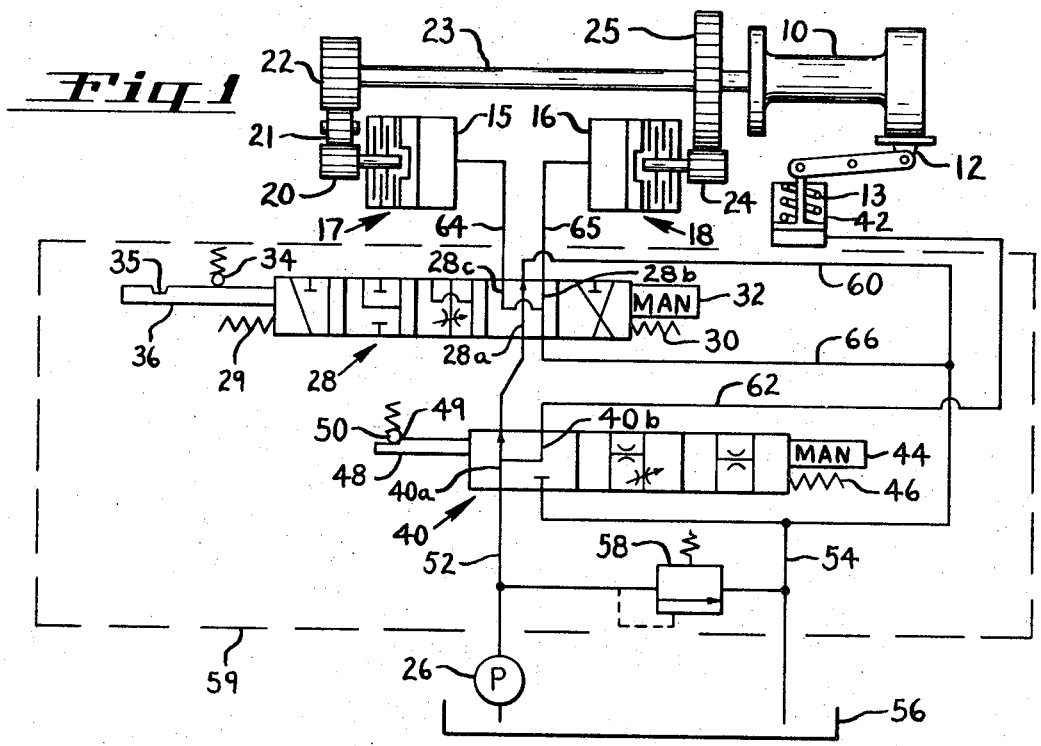
Fig_1
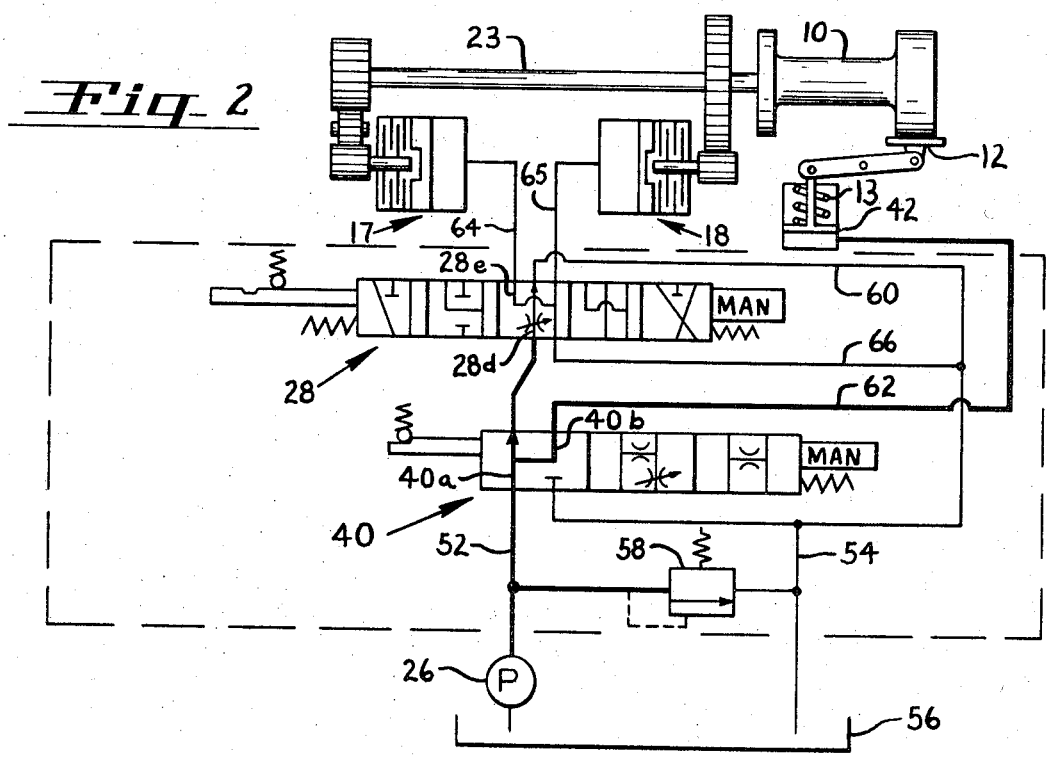
Fig_2
LAWRENCE O. OLSEN
INVENTOR
BY
BUCKHORN, BLORE, KLARQUIST & SPARKMAN
ATTORNEYS

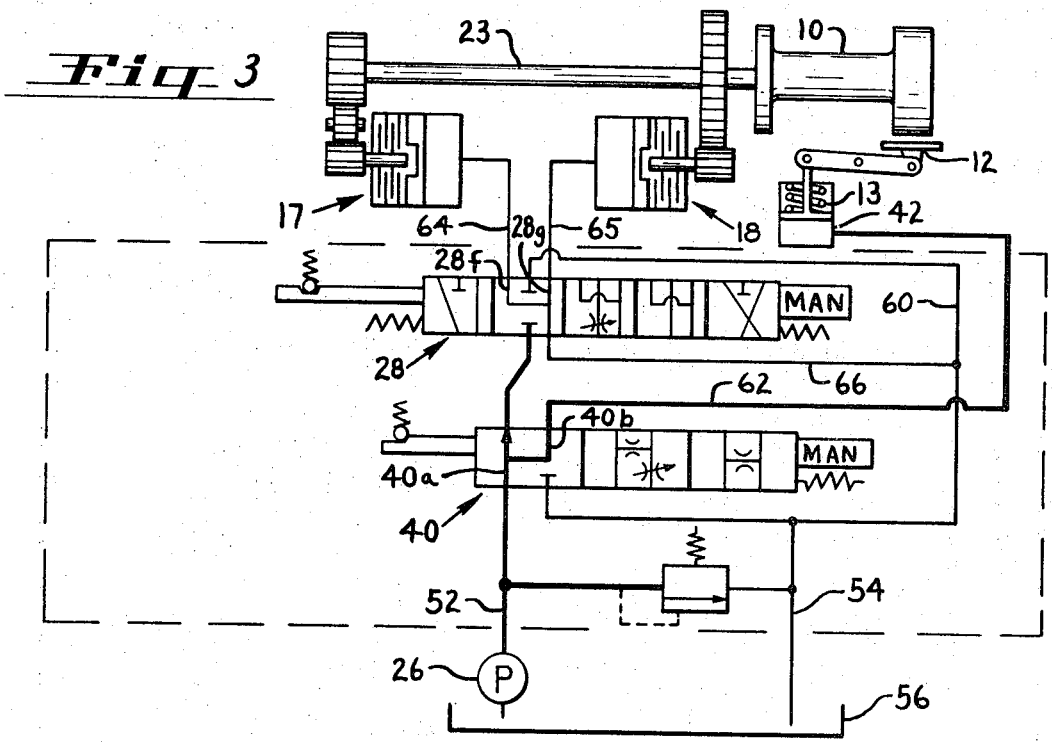
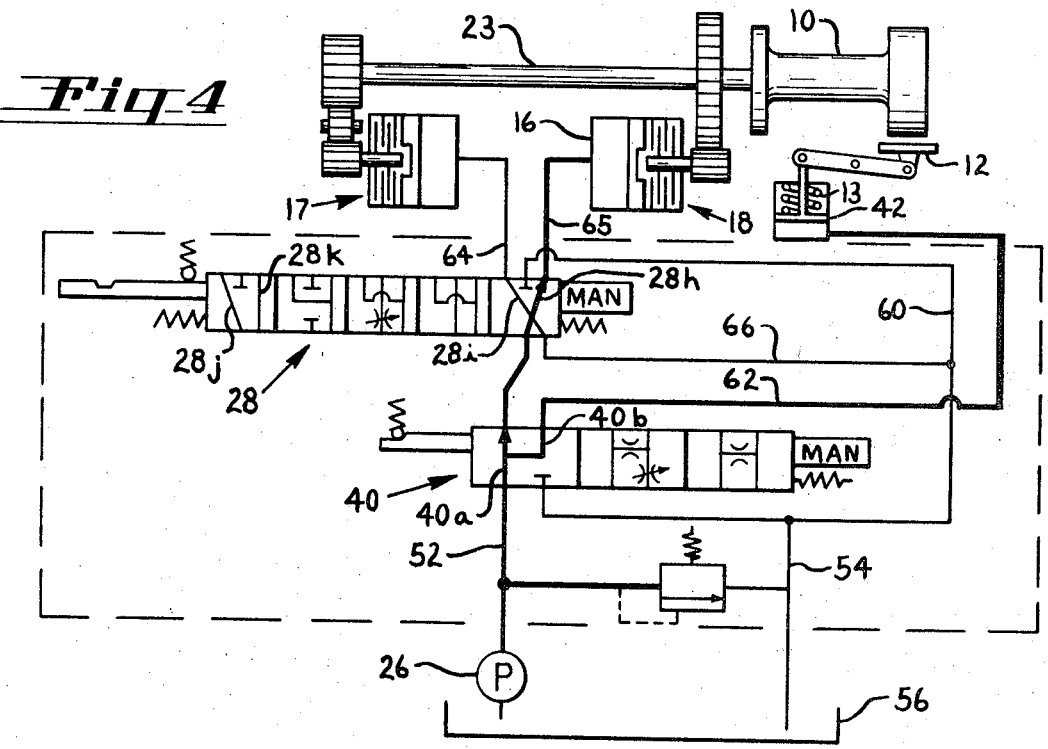

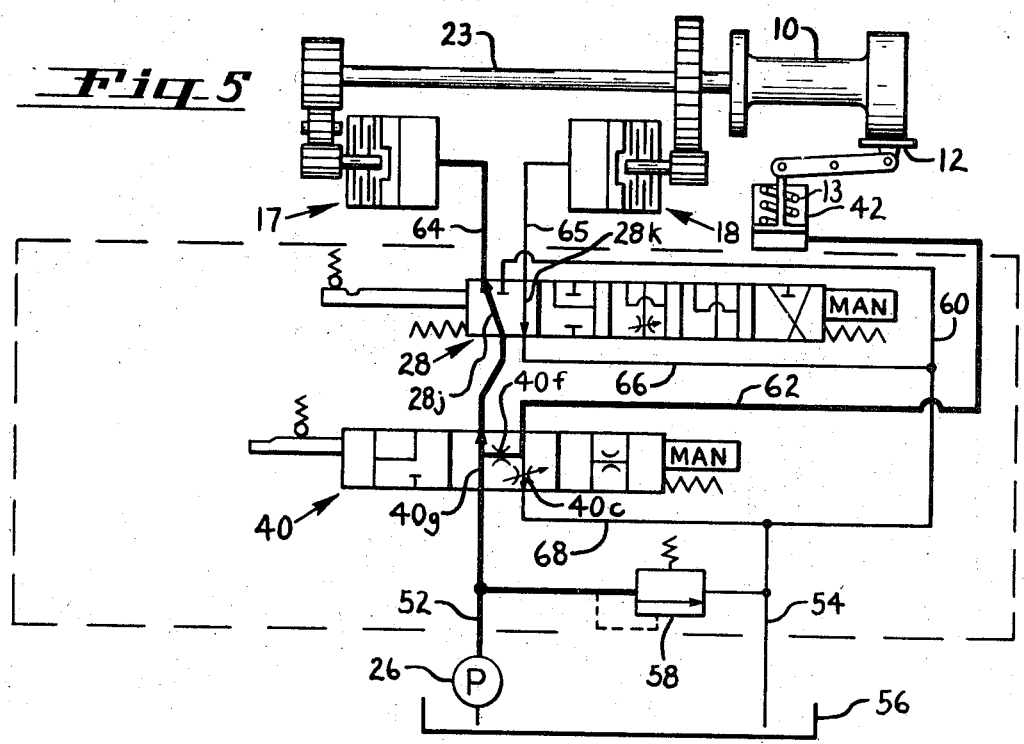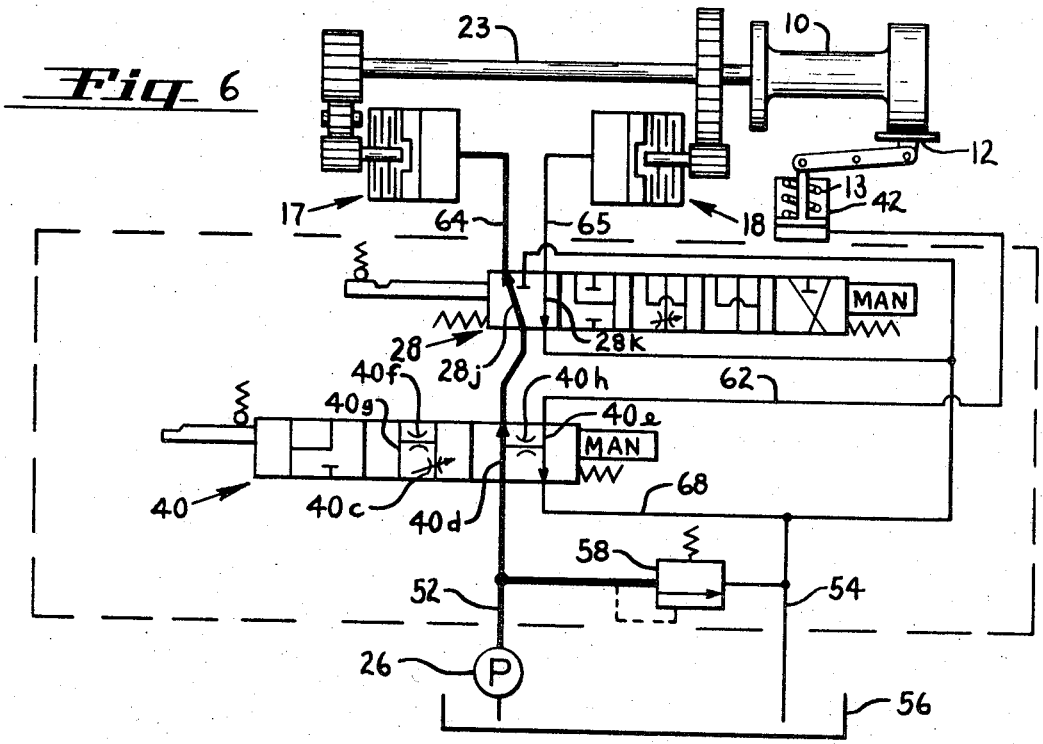

FLUID PRESSURE REVERSING CLUTCHES AND BRAKE FOR WINCH

BACKGROUND OF THE INVENTION

1. Field of the Invention

The present invention relates to a power-controlled winch and more particularly to a fluid control for such a winch.

1. Description of the Prior Art

The closest known prior art is U.S. Pat. No. 3,128,861 to Trondsen for a power-controlled winch, issued Apr. 14, 1964. With the Trondsen control circuit, it is possible only to inch a loaded line out while the clutches are disengaged from the winch drum. It is not possible with Trondsen to inch a load in or out while the winch drum is under power, which is desirable in order to move a load a short distance or to accelerate or decelerate smoothly a heavy load. Another disadvantage of the Trondsen-type control is that the inching function is controlled by a different valve and actuator than the clutching function. Although a few of the Trondsen-type circuits were modified in the past to enable inching while reeling in or reeling out under power, such modification rendered brake and clutch control entirely independent, through manipulation of two different valve controls, without any automatic simultaneous brake release upon engagement of one of the clutches.

SUMMARY OF THE INVENTION

The present invention overcomes the problems of the aforementioned prior art winch controls by providing a control which includes a single first valve for engaging either one of the clutches and releasing the brake on the winch drum simultaneously and automatically, and to permit free spooling or inching with clutches disengaged, and a second valve for selectively overriding the automatic and simultaneous brake release and engagement function of the first valve to permit fine inching with either clutch engaged. Thus the present control provides all of the functions of the original Trondsen control circuit, but in a single valve, plus the added function of inching while spooling in or spooling out under power.

Primary objects of the invention are to provide:

1. a winch control which permits inching of the winch drum while the winch clutches are either engaged or disengaged;
2. a winch control as aforesaid which also provides automatic, simultaneous clutch engagement and brake disengagement;
3. a control as aforesaid wherein the functions of clutch engagement and brake release, free spooling, and brake inching with clutches disengaged are all provided by a single valve and single manual actuator;
4. a winch control as aforesaid wherein a second valve overrides the operation of the first-mentioned valve with respect to control of operating pressure at the brake so that the brake can be inched by operation of the second valve in any position of the first valve, thereby providing brake inching control independent of clutch control;
5. a winch control as aforesaid enabling extremely fine inching control;
6. a winch control as aforesaid wherein fine inching control is obtained with a fixed displacement pump by inserting an orifice into the fluid passage to the brake when the overriding brake inching valve is operated to stabilize pressure in the brake circuit.

BRIEF DESCRIPTION OF THE DRAWINGS

The foregoing and other objects and advantages of the present invention will become more apparent from the following detailed description which proceeds with reference to the accompanying drawings wherein:

FIG. 1 is a diagrammatic view of a winch control in accordance with the invention showing the control circuit, including a selector valve and brake modulator valve, both in their neutral positions;

FIGS. 2, 3, 4, 5 and 6 are similar views, but FIG. 2 shows the circuit in its inching-with-clutches-disengaged condition, FIG. 3 with the circuit in its free-spooling condition, FIG. 4 with the circuit in its power-spool-in condition, FIG. 5 with the circuit in its inching-while-spooling-out-under-power condition, and FIG. 6 with the circuit in its brake-on-with-spooling-out-clutch-engaged (stalled) condition.

DETAILED DESCRIPTION

Description of Control Circuit

With reference to FIG. 1, the winch and its control includes a winch drum 10 having a brake 12 urged by a spring 13 into frictional engagement with the drum to brake the drum. The drum is driven by an engine (not shown) such as the engine of a crawler tractor, through a torque converter and power takeoff shaft. The drive is to a pair of rotary cylinders 15, 16 forming parts of a pair of fluid-operated friction clutches including a reverse or spooling-out clutch 17 and a forward or spooling-in clutch 18. Engagement of spooling-out clutch 17 through delivery of fluid under an operating pressure to the clutch drivingly connects its cylinder 15 to a gear 20 which meshes with an idler gear 21 which in turn meshes with a gear 22 fixed to a winch drum drive shaft 23 for rotating the drum 10 in a direction for reeling out line from the drum. Delivery of an operating pressure to forward clutch 18 drivingly connects its cylinder 16 to a gear 24 which meshes with a gear 25 on drive shaft 23 to cause rotation of the winch drum in a direction for reeling line onto the drum.

A power control circuit is provided to enable the clutches to be selectively engaged or disengaged, and the brake to be selectively engaged or disengaged or partially engaged for inching the winch drum. The control circuit includes a manually operable five-position spool selector valve 28 which controls the supply of fluid from a fixed displacement pump 26 to the forward and reverse clutches. The selector valve includes a "forward" position (FIG. 4), a "neutral" position (FIG. 1), an "inching" position (FIG. 2), a "free spool" position (FIG. 3) and a "reverse" position FIGS. 5 and 6). The selector valve is spring centered by springs 29, 30 to its neutral position and may be moved to any of its other positions by a single manual actuator 32. The selector valve also includes a spring detent 34 which engages a notch 35 of a shaft portion 36 of the selector valve when the spool is in its free spool position to hold it in that position when desired.

The control circuit also includes a brake modulator valve 40 which is a three-positioned spool-type valve for controlling the supply of pressure fluid to a brake cylinder 42. The three positions of the brake modulator valve includes a "neutral" position shown in FIGS. 1 through 4, an "inching" position shown in FIG. 5, and a brake "full on" position shown in FIG. 6, any of which may be selected manually by a valve actuator 44. The brake modulator valve spool is spring centered by a spring 46 to its "full on" position. However, the spool includes a shaft portion 48 with a shoulder 49 which is engageable by a detent 50 when the modulator spool is in its "neutral" position to selectively hold the spool in such position.

The circuit also includes a main supply line 52 delivering fluid from the pump and a main return line 54 returning fluid from the various components of the circuit to a sump 56. A pressure relief valve 58 in the circuit is connected across the supply line 52 and return line 54 to limit the maximum operating pressure of the circuit.

In practice the valve assembly and connecting passages between the two spool valves are contained within a single valve body 59 as indicated by the dashed rectangle in the various FIGS. The valve body is provided with the necessary inlet and outlet ports for connection of lines extending to the clutches, brake cylinder and pump.

Operation of Control Circuit

FIG. 1 shows the neutral positions of the selector valve 28 and brake modulator valve 40. With the valves in such positions fluid delivered by the pump through line 52 merely passes through passage 40a of valve 40 and through passage 28a of valve 28 and then through line 60 and main return line 54 back to sump without fluid at operating pressure being admitted to either one of the clutches or to the brake. At the same time, both clutches are open to sump through lines 64, 65, selector valve passages 28b and 28c, and line 66 connecting with line 60. Although in the neutral position of modulator valve 40 there is a passage 40b connecting to a line 62 leading to brake cylinder 42, an operating pressure does not build up at the brake cylinder because the circuit is open to sump 56. Thus, because operating pressure is not applied to the clutches or brake, the brake is engaged and the clutches are disengaged with both valves in their neutral positions.

FIG. 2 shows selector valve 28 moved to its inching position, with brake modulator valve 40 remaining in its neutral position. In this position of the selector valve, a variable orifice 28d in such valve tends to throttle the flow of pressure fluid through the selector valve while the valve remains connected to sump through lines 60 and 54 and without any fluid supply connection to the clutches. As a result, operating pressure can be selectively built up at brake cylinder 42 to partially release or inch the brake to provide a slow, controlled reeling out of line. However, the clutches remain disengaged since the clutches remain connected to sump by lines 64 and 65, a valve passage 28e and line 66. Thus by manipulating selector valve 28 between its spring centered neutral position, its inching position and its free spool position, a variable operating pressure can be applied to the brake, varying from no effective operating pressure in the neutral position to full operating pressure in the free spool position, thereby enabling the application of any desired amount of brake friction to the winch drum, with clutches disengaged.

FIG. 3 shows the selector valve 28 in its free spool position with brake modulator valve 40 remaining in its neutral position. With the valves so positioned, fluid flows through the modulator valve as before, but is blocked from the clutches and from sump 56 absolutely at the selector valve. This effects a buildup of operating pressure at brake cylinder 42 to release the brake completely. At the same time, the clutches are connected to sump 56 through lines 64 and 65 through selector valve passages 28f and 28g and line 66. As a result the clutches and brake are disengaged so that the winch drum 10 is free to rotate under the influence of a load on the winch cable.

To reel in or reel out cable under power, the selector valve is moved to its forward or reverse position, respectively, with the brake modulator valve 40 remaining in its neutral position. When the selector valve is shifted to either forward or reverse position, fluid at operating pressure is directed to the appropriate clutch and to the brake cylinder whereby the selected clutch is engaged and the brake simultaneously and automatically disengaged, without any manipulation of modulator valve 40 being required.

Referring to FIG. 4, the selector valve is shown in its forward or reel-in position to wind cable on the drum, with the modulator valve remaining in its neutral position.

Fluid at operating pressure flows through passage 40a of the brake modulator valve and thence through passage 28h of the selector valve and line 65 to forward clutch cylinder 16. At the same time, fluid at operating pressure is directed through brake modulator valve passage 40b and line 62 to brake cylinder 42 to release the brake. Simultaneously, reverse clutch 17 is connected to sump 56 by line 64, a selector valve passage 28i and line 66.

When selector valve 28 is shifted to its reverse position, simultaneous engagement of the reverse clutch 17 and brake disengagement will occur in a similar manner with fluid at operating pressure being directed to the reverse clutch through a selector valve passage 28j. At the same time forward clutch 18 will be connected to sump through a selector valve passage 28k.

With selector valve 28 in any of its aforementioned five positions, brake modulator valve 40 can be shifted from its neutral position toward the left to either its center inching position or its brake full-on position, to control operation of the brake without affecting operation of the clutches as determined by the selector valve. In other words, brake modulator valve 40 is capable of operating the brake independently of clutch operation through the selector valve.

For example, with the selector valve in its reverse or spooling-out position, a shifting of modulator valve 40 toward its center position as shown in FIG. 5, connects brake line 62 with a variable orifice 40c of the modulator valve and with a line 68 connected to sump, thereby tending to relieve pressure at the brake cylinder to at least partially reapply the brake to the winch drum. As a result, inching of the brake while the winch drum is being powered through either the forward or the reverse clutch as determined by the position of the selector valve can occur.

In FIG. 6 selector valve 28 is shown still in its reverse position, while the brake modulator valve is shifted to its brake full-on position. Fluid can still flow through passage 40d of the modulator valve and through passage 28j of the selector valve to apply operating pressure at the reverse clutch. However, a passage 40e of the modulator valve connects with lines 62 and 68 to relieve the brake cylinder 42 of its operating pressure so that the brake is fully applied to the winch drum. An orifice 40h between passages 40d and 40e prevents relief of clutch operating pressure. In this position of the valves, the torque converter will be, in effect, in a stalled condition.

However, by gradually shifting the modulator spool toward the right in FIG. 6, toward its inching position, the variable orifice 40c is slowly inserted between lines 62 and 66 to gradually reduce the amount of brake relief. The effect is to cause a gradual buildup of operating pressure at the brake cylinder to cause a partial disengagement of the brake from the winch drum and thus a controlled "slipping" of the brake and rotation of the drum under power. This technique is applied when it is desired to move a stationary load a short distance, or to smoothly and gradually accelerate a large stationary load. If only the selector valve is used to accelerate a heavy load, the simultaneous clutch engagement and brake disengagement provided by such valve would be likely to cause an initial jerking movement of the load.

When variable orifice 40c is used to relieve pressure to the brake, an orifice 40f between variable orifice 40c and passage 40g leading to the selector valve is in effect inserted between the brake on the one hand and the pump and clutch on the other hand. This ensures that pressure to the clutches will not be relieved, and thus there will be no clutch slippage while brake application is occurring. The orifice 40f also ensures that pump pressure is stabilized at its preset relief pressure as determined by valve 58 so that brake modulation will not be pressure sensitive.

From the foregoing it will be apparent that the five-position selector spool valve combines, in a single valve member, the functions of both spool valves in the prior art Trondsen design, namely, clutch and brake operation combined with inching while clutches are disengaged. The added brake modulator valve allows inching while the clutches are engaged by increasing or reducing pressure at the brake independently of the position of the selector valve and thus providing an independent brake control. In effect the modulator valve overrides the selector valve with respect to brake operation.

"Clutch" as used herein means a device for connecting or disconnecting two rotatable members.

"Brake" as used herein means a device for applying resistance to the motion of a body.

Having illustrated and described a preferred embodiment of the invention, it will be apparent to those skilled in the art that the same permits of modification in arrangement and detail. I claim as my invention all such modifications as come within the true spirit and scope of the following claims.

I claim:

1. A power-controlled winch comprising:
 a drum,
 a drive to the drum including first and second fluid-actuated clutches,
 a fluid-actuated brake for the drum biased to engaged position but releasable under an operating pressure;
 a source of fluid under pressure;
 passage means connecting said source to said clutches and said brake;
 a selectively operable first valve for controlling fluid pressure so as to provide simultaneously fluid operating pressure at said brake and at either one or the other of said clutches to simultaneously engage one of said clutches and release said brake; and
 a selectively operable second valve operable independently of said first valve for relieving operating pressure at said brake while one or the other of said clutches remains under operating pressure so that said brake may be selectively partially or fully engaged while said clutch is engaged.

2. Apparatus according to claim 1 wherein said second valve includes modulating means for gradually increasing and reducing the operating pressure at said brake for inching said brake while said clutch is engaged.

3. Apparatus according to claim 2 including pressure control means for maintaining an operating pressure at said clutch while said modulating means is relieving operating pressure at said brake.

4. Apparatus according to claim 2 including:
 fluid passage means connecting said first valve means and said brake in parallel with each other to said source; and
 flow restricting means insertable between said brake on the one hand and said first valve means and said source on the other hand for maintaining operating pressure at said clutch while said modulating means is relieving operating pressure at said brake.

5. Apparatus according to claim 4 including:
 pressure relief means for limiting the maximum pressure within said fluid passage means; and
 said restricting means having a restriction sized so that under normal operating conditions said operating pressure at said clutch is maintained at the maximum allowed by said pressure relief means while said modulating means is relieving pressure at said brake.

6. Apparatus according to claim 1 wherein said first valve includes means for relieving said clutch and said brake simultaneously from said operating pressure so that said clutch may be disengaged while said brake is simultaneously engaged.

7. Apparatus according to claim 1 wherein said first valve includes means for relieving said clutch from said operating pressure while directing fluid under operating pressure to said brake for free spooling said winch drum.

8. In a power-controlled winch:
 a drum;
 a drive to the drum including first and second fluid-actuated friction clutches;
 a fluid-actuated brake for the drum biased to the engaged position but releasable under an operating pressure;
 a source of fluid under pressure;
 passage means connecting said source to said clutches and said brake; and
 a single valve member for:
  1. controlling fluid pressure so as to simultaneously provide a fluid operating pressure at said brake and at one or the other of said clutches; or
  2. for isolating said clutches and brake simultaneously from such operating pressure; or
  3. for isolating said clutches and brake simultaneously from such operating pressure; or
  4. for gradually increasing or decreasing the fluid pressure applied to said brake while said clutches are isolated from such operating pressure.

9. Apparatus according to claim 8 including a single control handle for operating said valve member to effect the operations mentioned.

10. A control means for a power-controlled winch having:
 a drum, a drive to the drum including a pair of fluid-actuated clutches and a fluid-actuated brake for the drum biased to an engaged position but releasable under an operating pressure, a source of fluid pressure, and passage means connecting said source to said clutches and said brake,
 said control means comprising:
 a selectively operable first valve movable to one position for providing a fluid operating pressure at either one of said clutches and automatically and simultaneously at said brake to engage one of said clutches and simultaneously release said brake; and
 a second valve selectively operable to override said first valve and vary the fluid pressure at said brake while said clutch remains under an operating pressure so that said brake may be selectively and variably engaged while said clutch is engaged.

11. In a power-controlled winch having:
 a drum, a drive to the drum including first and second fluid-actuated friction clutches, a fluid-actuated brake for the drum biased to an engaged position but releasable under an operating pressure, a source of fluid under pressure, and passage means connecting said source to said clutches and said brake,
 winch control means comprising valve means for:
  1. directing fluid under operating pressure to one or the other of said clutches to engage one of said clutches, and simultaneously and automatically to said brake to disengage said brake; or
  2. for isolating said clutches and brake simultaneously from such operating pressure to prevent rotation of said drum; or
  3. for isolating only said clutches from such operating pressure to permit freewheeling of said drum; or
  4. for gradually increasing or decreasing the fluid pressure applied to said brake while said clutches are isolated from such operating pressure to retard rotation of said drum while said clutches are disengaged; or
  5. for gradually increasing or decreasing the fluid pressure applied to said brake while fluid under operating pressure is directed to one or the other of said clutches to retard rotation of said drum while one of said clutches is engaged.

12. A winch control means according to claim 11 wherein the aforesaid five functions are carried out by a first five-position valve and a second three-position valve.

13. A winch control according to claim 11 wherein the first four of the aforesaid functions are carried out by a first five-position valve and the fifth of the aforesaid functions is carried out by a second valve.

14. A winch control means for a power-controlled winch having a drum, a drive to the drum, including a fluid-actuated clutch, a fluid-actuated brake for the drum biased to an engaged position but releasable under an operating pressure, a source of fluid under pressure, and passage means connecting said source to said clutch and said brake, said winch control means comprising:
 a first valve for:
  1. simultaneously providing a fluid operating pressure at said brake and at said clutch to engage said clutch and release said brake; or
  2. for gradually increasing or decreasing the operating pressure applied to said brake while said clutch is isolated from such operating pressure to permit inching movement of said drum while said clutch is disengaged; and
 a second valve for:

3. gradually increasing or decreasing the operating pressure applied to said brake while said clutch is under an operating pressure to permit inching movement of said drum while said clutch is engaged.

15. A power-controlled winch comprising:

a drum;

a drive to the drum including a fluid-actuated clutch;

a fluid-actuated brake for the drum biased to engaged position but releasable under an operating pressure;

a source of fluid under pressure;

passage means connecting said source to said clutch and said brake;

a selectively operable first valve for:
   a. providing fluid operating pressure at said brake and simultaneously at said clutch to simultaneously release said brake and engage said clutch, or for
   b. isolating said clutch from operating pressure while providing an operating pressure at said brake to enable freewheeling rotation of said drum; and a selectively operable second valve for relieving operating pressure at said brake while said clutch remains under an operating pressure so that said brake may be selectively partially or fully engaged while said clutch is engaged.

UNITED STATES PATENT OFFICE
CERTIFICATE OF CORRECTION

Patent No. 3,550,735         Dated December 29, 1970

Inventor(s) LAWRENCE O. OLSEN

It is certified that error appears in the above-identified patent and that said Letters Patent are hereby corrected as shown below:

Claim 8, column 5, lines 74-75, should be --(3) for isolating only said clutches from such operating pressure, or--.

Signed and sealed this 29th day of May 1973.

(SEAL)
Attest:

EDWARD M. FLETCHER, JR.
Attesting Officer

ROBERT GOTTSCHALK
Commissioner of Patents